Figure 1:
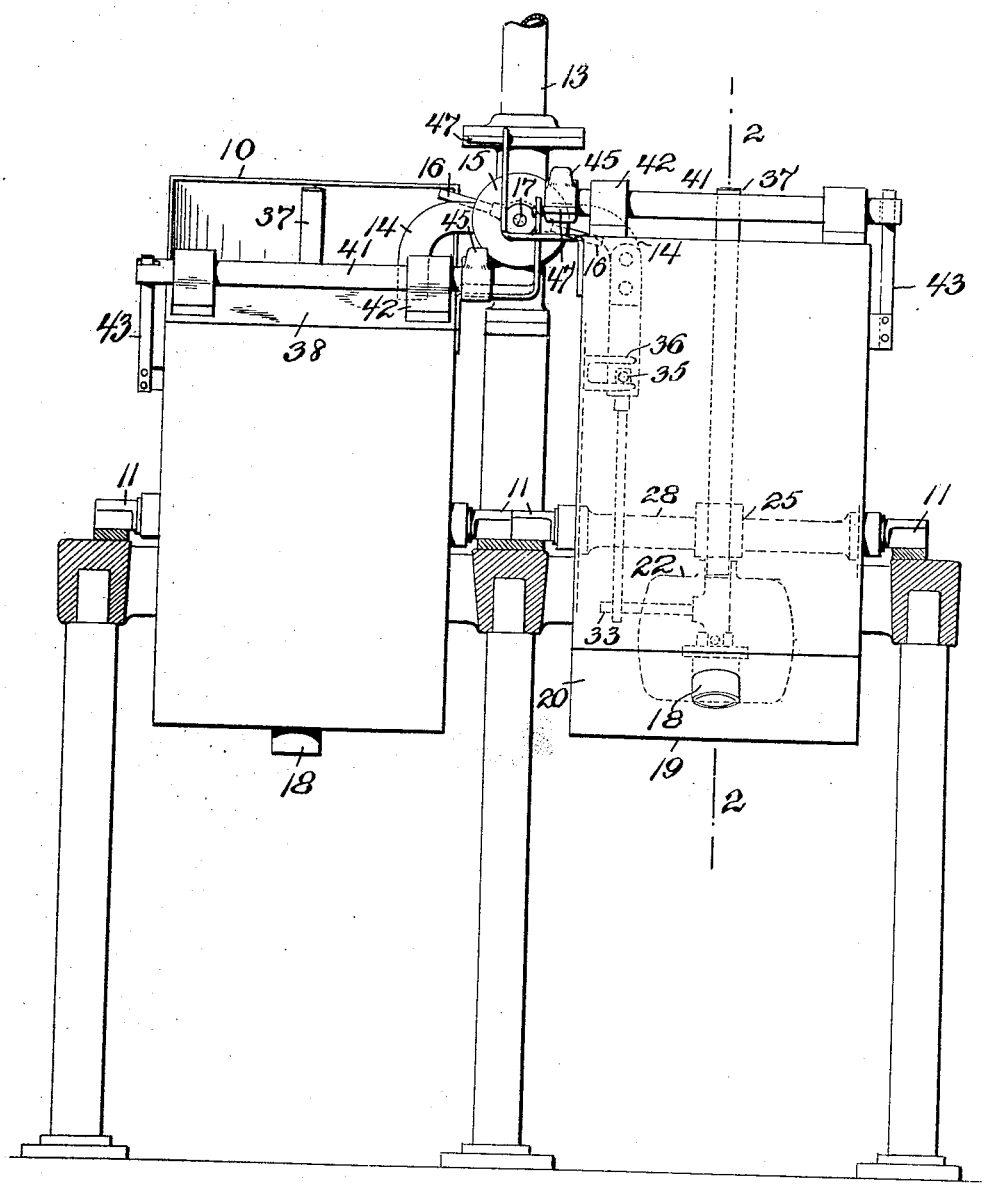

July 10, 1923.

W. W. LEINERT 1,461,424

LIQUID MEASURING MACHINE

Filed Nov. 12, 1921

2 Sheets—Sheet 1

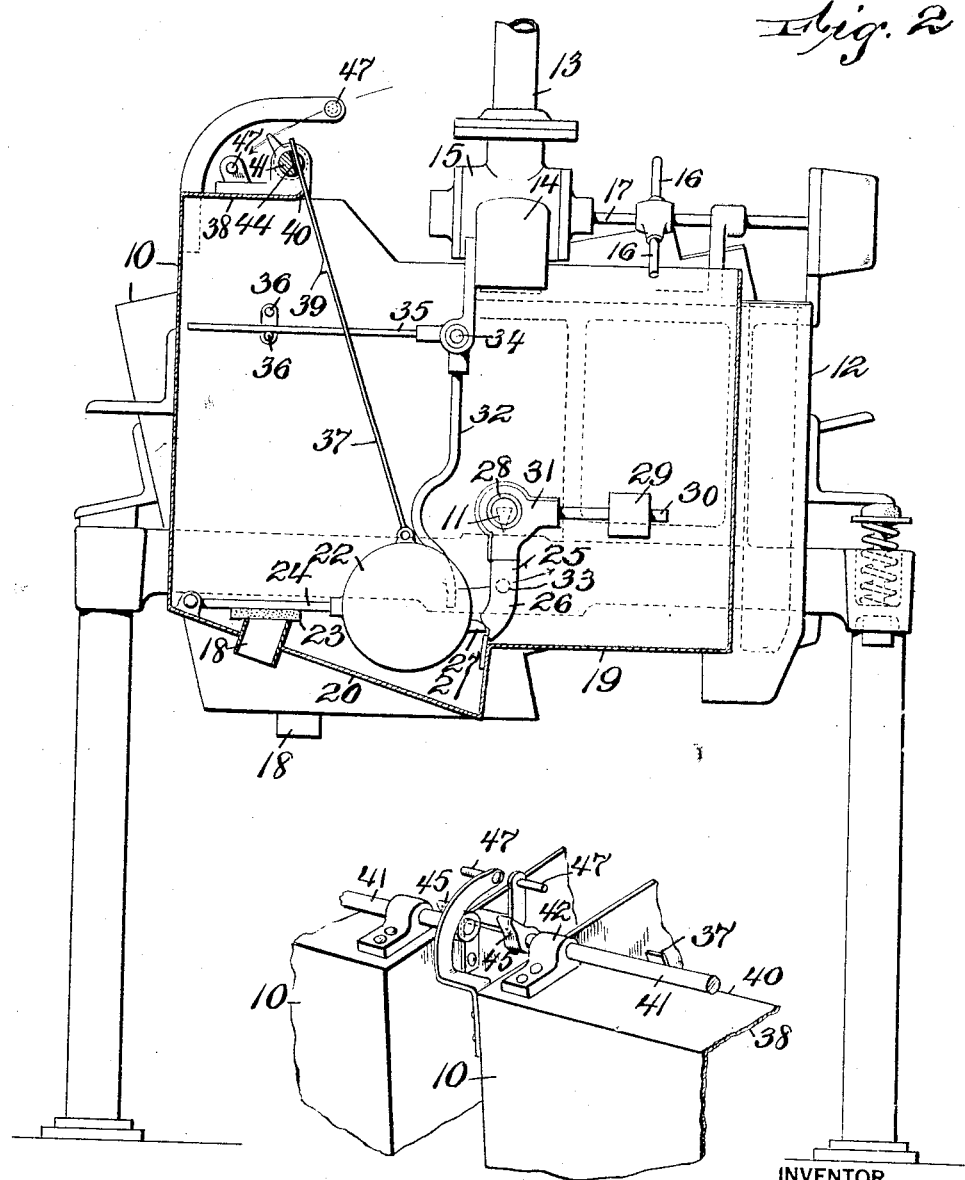

Patented July 10, 1923.

1,461,424

UNITED STATES PATENT OFFICE.

WENZEL W. LEINERT, OF NEW YORK, N. Y.

LIQUID-MEASURING MACHINE.

Application filed November 12, 1921. Serial No. 514,637.

*To all whom it may concern:*

Be it known that I, WENZEL W. LEINERT, a citizen of the United States, and a resident of New York, county of New York, and State of New York, have invented certain new and useful Improvements in Liquid-Measuring Machines, of which the following is a specification.

This invention relates to an improved machine for measuring liquids, and is of the type in which a tank or tanks are yieldingly held in receiving position, and when the required weight of liquid is deposited in the tank such tank is caused to tilt, and when so tilted the liquid is dispensed from the tank which, on being emptied or nearly so, is permitted to resume its receiving position.

Such tanks have been used in which the outlet is in the form of a siphon, and the present invention relates to an improved means for emptying the tank, dispensing with the siphon, particularly in the use of the device in measuring liquids that foam, in which the foaming often initiates the siphon action before the actual tilting of the tank takes place, and is also desirable with viscous liquids.

The invention further relates to a machine of this kind in which a positive opening and closing of the outlet of the tank takes place, so that the amount of liquid deposited into and withdrawn from the tank is precise.

The invention further consists in certain details of construction to be hereinafter more fully described and finally embodied in the claims.

The invention is illustrated in the accompanying drawings, in which Figure 1 is a front view showing one form of machine embodying my invention. Figure 2 is a section on line 2—2 in Figure 1. Figure 3 is a perspective view of part of the two tanks and showing releasing means of a catch for a float used in the machine.

In the form of machine illustrated there are two tanks 10 and they are duplicates, so that a description of one will suffice as a description of the other, and while it will be evident that one tank can be used, the usual form of machine embodies two; therefore two, with their cooperating parts, will be set forth herein.

The tanks are mounted in suitable bearings 11 which are located slightly in rear of the center, as will be evident from Figure 2, and the tanks are yieldingly held in normal or receiving position by suitable counter-weights 12 which are preferably made adjustable. The tanks are thus normally held by the counter-weights in the position shown to the right in Figure 1 and in the sectional tank shown in Figure 2, and when a sufficient predetermined quantity of liquid has been deposited in the tank the weight thereof will overcome the influence of the counter-weights 12 and the tank will tilt, as shown in the more distant tank in Figure 2 and in the tank on the left hand side of Figure 1.

The inlet pipe 13 is provided with spouts 14, one on each side, so as to deliver to either of the tanks, and such delivery is controlled by means of a valve 15 which is actuated by fingers 16 on the stem 17, which fingers are adapted to be engaged by the edges of the tank, these fingers 16 being engaged alternately by a tank assuming its tilted position, thus opening the valve into the other tank and shutting it off from the tilting one.

So far as described the device is old, and the operation thereof is fully set forth and described in my Patent No. 1,103,303, issued July 14, 1914, for liquid weighing device.

In order to make the description clear I will describe one of the tanks and its outlet mechanism, since the description of one tank will act fully as a description of the other. The tank is provided with an outlet 18, usually in the form of a pipe, and is preferably arranged in the bottom 19 of the tank at its forward portion, which portion of the bottom is preferably inclined, as at 20, to form a depressed part 21 which permits an accumulation of water, or rather a retention of water, since the outlet pipe 19 extends part way above the bottom 20 such small quantity of water as is retained having a use to be hereinafter fully described.

A float 22 is arranged in the tank and is connected to a valve 23 by means of an arm or arms 24, the float being air-tight and thus buoyant and therefore having a normal tendency, when submerged, to open the valve. It is held down by a latch 25, the arm 26 of which is adapted to engage a nose 27 on the float, the latch being pivoted at a suitable point, a convenient place being the sleeve 28 extending through the tank and connecting the pivotal points or bearings 11 of the tank, the latch being yieldingly held in position by suitable means, such as a weight 29 on the stem 30, which is connected to the hub 31 of the latch. The weight 29 thus normally holds the latch in its locking position to normally hold the float down the latch being adapted to be released by means of tripping means including an arm 32 which has its free end so disposed that when swung it will engage the pin 33 of the arm 26, the arm 32 being pivoted, as at 34, a convenient place being the end of the spout 14, and has an arm 35 seated between studs 36 on the side of the tank so that when the tank tilts it will move the arm 35 and thus control the tripping mechanism.

In order to hold the float in raised position I provide a suitable catch which, in the form shown, comprises a rod 37 which is hinged to the float and rests against the back edge 40 of the lip 38 at the top of the tank and has a tooth 39 which catches over the edge 40 of the lip 38 when the float is raised.

The tilting operation and the movement of the mechanism caused thereby is as follows:

Assuming that the tank is level and in receiving position, fluid passes into it from the spout 14 and rises steadily therein, submerging the float 22 and filling the tank to the required height where the tank will tilt, the float in the meantime being held down by the latch 25, as will be clearly seen from Figure 2. The float in its submerged position thus holds the valve 23 on the outlet pipe 19 shut. When the tank tilts forward the upper stud 36 engages the arm 35 and swings the arm 32 of the tripping device so that it hits the pin 33 of the latch 25, which in turn releases the float, the float, due to its buoyancy, at once rising, thus opening the valve 23 and permitting the contents of the tank to pass out through the outlet pipe 19. The float, when thus raised, has forced the rod 37 up until the tooth 39, which provides a catch, rests on the edge 40 of the top plate 38.

When the tank resumes its normal position after it has been emptied so far as possible, the float 22 is still suspended, and means are provided for then releasing the float to permit it to fall into the position in which it will close the valve 23, the shock of stopping such float being absorbed by the body of liquid in the depressed part 21 of the bottom.

The means for releasing the float from its raised position to enable it to drop in engagement with the lock and to close the valve will now be described.

Since I have illustrated, in the drawings, a pair of tanks, I also show a release for the catch of the float in which the float in one tank is released by means operated from the other tank. A shaft 41 is mounted on each tank, rotatable in bearings 42 and normally but yieldingly held in position by a spring 43, this shaft having a recessed part 44 which has a flat face, in which recessed part the rod 37 can slide. Attached to the shaft 41 is a lip 45, the lip on each tank being in the path of travel of the finger 47 on the other tank, these fingers being disposed so that they do not interfere with each other, as will be seen from Figures 1 and 3.

It will be evident that when the float is raised and the hook 39 is caught over the edge 40 of the top plate 38, the tank is ready to receive liquid, and at this time the other tank tilts and its finger 47 engages the lip 45 and twists the shaft 41 enough to have the rounded part of the shaft adjacent the recess 44 engage the rod 37 and move it out far enough to cause the hook 39 to be disengaged from the top plate 38, which at once releases the float 22 and it drops into the position where it closes the valve 23 and in its descent swings the latch 25 against the influence of the weight 29, and the nose 27 becomes seated under the latch 25 and the float is thus held down as previously described when the level of liquid in the tank rises.

It will be evident that modifications can be made in the form and assembly of the parts without departing from the scope of the invention.

I claim:

1. A liquid measuring machine comprising a tilting tank having an outlet therein, a valve to close the outlet, a float to raise the valve, means for holding the float submerged, and a tripping device operated by the tilting of the tank to release the holding means.

2. A liquid measuring machine comprising a tilting tank having an outlet at the bottom thereof, a valve to close the outlet, a float on the valve, the normal tendency of the float being to open the valve when the float is submerged, a latch to hold the float submerged, and a tripping device operated by the tilting of the tank to engage the latch to cause it to release the float.

3. A liquid measuring machine comprising a tilting tank having an outlet at the bottom thereof, a valve to close the outlet, a float on the valve, the normal tendency of the float being to open the valve when the float is submerged, a latch to hold the float submerged, a tripping device operated by the tilting of the tank to engage the latch to cause it to release the float, means for locking the float in raised position, and means for releasing the float from such locking means.

4. A liquid measuring machine comprising a pair of tilting tanks having outlets therein, a float in each tank, a valve connected to each float and adapted to close the outlet in a tank, a latch in each tank for holding the float submerged, a tripping device in each tank for operating its latch when the tank is tilted, a catch on each tank for holding its float in raised position and coacting means on the tanks so that each tank, when passing from its tilted position, releases the catch on the other tank.

In testimony that I claim the foregoing, I have hereto set my hand, this 9th day of November, 1921.

WENZEL W. LEINERT.